US010776398B2

(12) United States Patent
Tiell et al.

(10) Patent No.: US 10,776,398 B2
(45) Date of Patent: Sep. 15, 2020

(54) PLATFORM DATA LIFECYCLE MANAGEMENT

(71) Applicant: Accenture Global Solutions Limited, Dublin (IE)

(72) Inventors: Steven Tiell, San Francisco, CA (US); Shimon Modi, San Francisco, CA (US); Chetan R. Kundavaram, Fremont, CA (US)

(73) Assignee: Accenture Global Solutions Limited, Dublin (IE)

( * ) Notice: Subject to any disclaimer, the term of this patent is extended or adjusted under 35 U.S.C. 154(b) by 978 days.

(21) Appl. No.: 15/095,485

(22) Filed: Apr. 11, 2016

(65) Prior Publication Data

US 2017/0053131 A1  Feb. 23, 2017

Related U.S. Application Data

(60) Provisional application No. 62/206,078, filed on Aug. 17, 2015.

(51) Int. Cl.
*G06F 16/28* (2019.01)
*G06F 16/16* (2019.01)
(Continued)

(52) U.S. Cl.
CPC .......... *G06F 16/285* (2019.01); *G06F 16/113* (2019.01); *G06F 16/162* (2019.01);
(Continued)

(58) Field of Classification Search
CPC . G06G 10/20; G06F 11/0742; G06F 11/1448; G06F 16/285; H04Q 9/00; G06Q 10/20
See application file for complete search history.

(56) References Cited

U.S. PATENT DOCUMENTS 8,413,251 B1   4/2013  Gibney et al.
8,805,699 B1   8/2014  Lang
(Continued)

FOREIGN PATENT DOCUMENTS

WO   WO 2016063092   4/2016

OTHER PUBLICATIONS

U.S. Non-Final Office Action for U.S. Appl. No. 15/093,374, dated Oct. 26, 2018, 20 pages.
(Continued)

*Primary Examiner* — Etienne P Leroux
(74) *Attorney, Agent, or Firm* — Fish & Richardson P.C.

(57) ABSTRACT

Techniques are described for receiving data generated by multiple platforms of different types, and managing the data in multiple stages of a data lifecycle associated with a super-platform. An end-user (e.g., data discloser) may interact with multiple individual (e.g., siloed) platforms of different types. The individual platforms may generate data describing, and/or resulting from, these interactions with end-user(s). The data from the various individual platforms may be received, ingested, stored, analyzed, aggregated, and/or otherwise processed by a super-platform during various stages of a data lifecycle. In some implementations, the end-user, the super-platform, and/or the individual platform (s) may provide one or more restrictions on how the data may be handled in each of the stages of the data lifecycle.

20 Claims, 4 Drawing Sheets

(51) Int. Cl.
*H04L 29/08* (2006.01)
*G06F 16/22* (2019.01)
*G06F 16/2457* (2019.01)
*G06F 16/9535* (2019.01)
*G06F 16/11* (2019.01)
*G06F 16/29* (2019.01)
*G06F 21/62* (2013.01)
*G06Q 30/02* (2012.01)
*G06Q 30/06* (2012.01)
*H04L 12/26* (2006.01)

(52) U.S. Cl.
CPC ........ *G06F 16/22* (2019.01); *G06F 16/24575* (2019.01); *G06F 16/29* (2019.01); *G06F 16/9535* (2019.01); *G06F 21/6227* (2013.01); *G06F 21/6236* (2013.01); *G06Q 30/0201* (2013.01); *G06Q 30/0601* (2013.01); *G06Q 30/0631* (2013.01); *H04L 43/04* (2013.01); *H04L 43/0876* (2013.01); *H04L 67/22* (2013.01)

(56) References Cited

U.S. PATENT DOCUMENTS

| | | | |
|---|---|---|---|
| 9,928,290 | B2 | 3/2018 | Tiell |
| 1,050,980 | A1 | 12/2019 | Tiell et al. |
| 1,059,967 | A1 | 3/2020 | Tiell et al. |
| 2002/0099643 | A1 | 7/2002 | Abeshouse |
| 2007/0103984 | A1 † | 5/2007 | Kavuri et al. |
| 2009/0037355 | A1 | 2/2009 | Brave |
| 2009/0224941 | A1 * | 9/2009 | Kansal .................. H04Q 9/00 340/870.06 |
| 2009/0228397 | A1 | 9/2009 | Tawakol et al. |
| 2011/0054934 | A1 | 3/2011 | Vesto |
| 2011/0276423 | A1 | 11/2011 | Davidson |
| 2012/0054680 | A1 | 3/2012 | Moonka et al. |
| 2012/0197856 | A1 | 8/2012 | Banka et al. |
| 2012/0254289 | A1 | 10/2012 | Sathish |
| 2012/0290950 | A1 | 11/2012 | Rapaport |
| 2012/0303736 | A1 | 11/2012 | Novotny et al. |
| 2013/0110969 | A1 * | 5/2013 | Wertheimer ........ G06F 11/1448 709/216 |
| 2013/0191418 | A1 | 7/2013 | Martin |
| 2013/0197968 | A1 | 8/2013 | Davis |
| 2013/0204669 | A1 | 8/2013 | Percy |
| 2014/0180826 | A1 | 6/2014 | Boal |
| 2014/0207622 | A1 | 7/2014 | Vijayaraghavan |
| 2014/0244399 | A1 | 8/2014 | Orduna et al. |
| 2014/0344015 | A1 | 11/2014 | Puertolas-Montanes et al. |
| 2015/0019342 | A1 * | 1/2015 | Gupta .................. G06Q 10/20 705/14.66 |
| 2015/0019714 | A1 | 1/2015 | Shaashua et al. |
| 2015/0220734 | A1 | 8/2015 | Nalluri et al. |
| 2016/0173622 | A1 * | 6/2016 | Ruben ................... H04L 67/18 709/204 |
| 2016/0306689 | A1 * | 10/2016 | Jain .................... G06F 11/0742 |
| 2017/0032248 | A1 | 2/2017 | Dotan-Cohen |
| 2017/0046806 | A1 | 2/2017 | Haldenby et al. |
| 2017/0053015 | A1 | 2/2017 | Tiell et al. |
| 2017/0053032 | A1 | 2/2017 | Tiell et al. |
| 2017/0053131 | A1 | 2/2017 | Modi et al. |
| 2017/0053295 | A1 | 2/2017 | Tiell et al. |
| 2017/0054611 | A1 | 2/2017 | Tiell et al. |

OTHER PUBLICATIONS

U.S. Final Office Action for U.S. Appl. No. 15/093,344, dated Dec. 5, 2018, 16 pages.

[No Author Listed], "Internet of things IoT semantic interoperability: research challenges, best practices, recommendations and nest steps" European Research Cluster on the Internet of Things, Mar. 2015, 48 pages.

U.S. Non-Final Office Action for U.S. Appl. No. 15/093,344, dated May 3, 2018, 20 pages.

U.S. Notice of Allowance for U.S. Appl. No. 15/095,481, dated Jan. 22, 2018, 24 pages.

Alex Jara et al. "Semantic Web of Things: an analysis of the application semantics for the IoT moving towards the IoT Convergence" in International Journal of Web and Grid Service, Apr. 2014.

\* cited by examiner
† cited by third party

PLATFORM DATA LIFECYCLE MANAGEMENT

CROSS-REFERENCE TO RELATED APPLICATION

This application claims priority to U.S. Provisional Patent Application Ser. No. 62/206,078 filed on Aug. 17, 2015, titled "Super-Platform," which is hereby incorporated by reference in the entirety.

BACKGROUND

With the rapid growth of ubiquitous computing and the Internet of Things (IoT), users are interacting with many different computing systems in the course of their lives. In addition to interacting with devices whose primary function is computing, such as home computers, mobile computing devices, server computers, and so forth, users may also interact with devices that include computers as components, such as smart appliances, automotive computers, or any number of IoT devices. The various computing devices may generate data regarding users, and such data may be generated and delivered using different formats, models, or communications channels.

SUMMARY

Implementations of the present disclosure are generally directed to managing data during various stages of a data lifecycle. More specifically, implementations are directed to receiving and aggregating, at a super-platform, data generated by multiple individual platforms of various types, and applying restrictions to the data, aggregate data, analysis results, and/or other information through the various stages of a data lifecycle managed by the super-platform.

In general, innovative aspects of the subject matter described in this specification can be embodied in methods that includes actions of: receiving restrictions governing the handling of data during multiple stages of a data lifecycle, wherein the data is generated at a plurality of individual platforms associated with a super-platform; and applying a respective set of the restrictions to data handling actions performed during each of at least two different stages of the data lifecycle.

Implementations can optionally include one or more of the following features: the multiple stages include a first stage in which the data handling actions include one or more of generation of the data at the plurality of individual platforms, or collection of the data at the super-platform; the multiple stages include a second stage in which the data handling actions include storage of the data; the multiple stages include a third stage in which data handling actions include one or more of sale of the data to at least one data consumer, distribution of the data to the at least one data consumer, aggregation of the data, or analysis of the data; the multiple stages include a fourth stage in which data handling actions include one or more of archiving the data, or deletion of the data; the restrictions are provided by one or more of at least one end-user of the plurality of individual platforms; at least one of the plurality of individual platforms, or the super-platform; and/or the plurality of individual platforms include at least two of an e-commerce platform configured to provide an e-commerce service, a retail platform configured to support retail operations of a physical store, a media platform configured to provide an online media service, a mobile computing device, an Internet of Things (IoT) computing device, or an in-vehicle computer.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide the following advantages. By applying a particular set of restrictions to data handling actions performed in each of multiple stages of a data lifecycle, implementations provide a technical advantage over traditional systems that may apply restrictions less discriminately. For example, a traditional system that redundantly applies the same restrictions during each stage of a data lifecycle may consume more processing power, memory, storage, network bandwidth, and/or other computing resources compared to a system that selectively applies different sets of restrictions during different stages according to the implementations described herein. Implementations provide more granular control over automation at different stages of the lifecycle, compared to traditional systems. For example, when examining data storage, a different set of ethical questions may be asked at each stage. If data is stored in a global cloud, the super-platform may confirm (e.g., for a user) the geography and/or export controls of the data source. A determination may be made whether the data may be reassembled for analysis that allows storage to stay within a country of origin. A determination may be made whether distributed analysis techniques are to be provided, depending on the country of origin, and/or whether insights may still be retrieved. Data deletion may also have its own particular requirements, such as an expiry period with automatic deletion, notification to a party, secure wipes, and so forth. Other ethical questions may also be applicable and/or answerable at the various stages of the lifecycle, as described further below.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
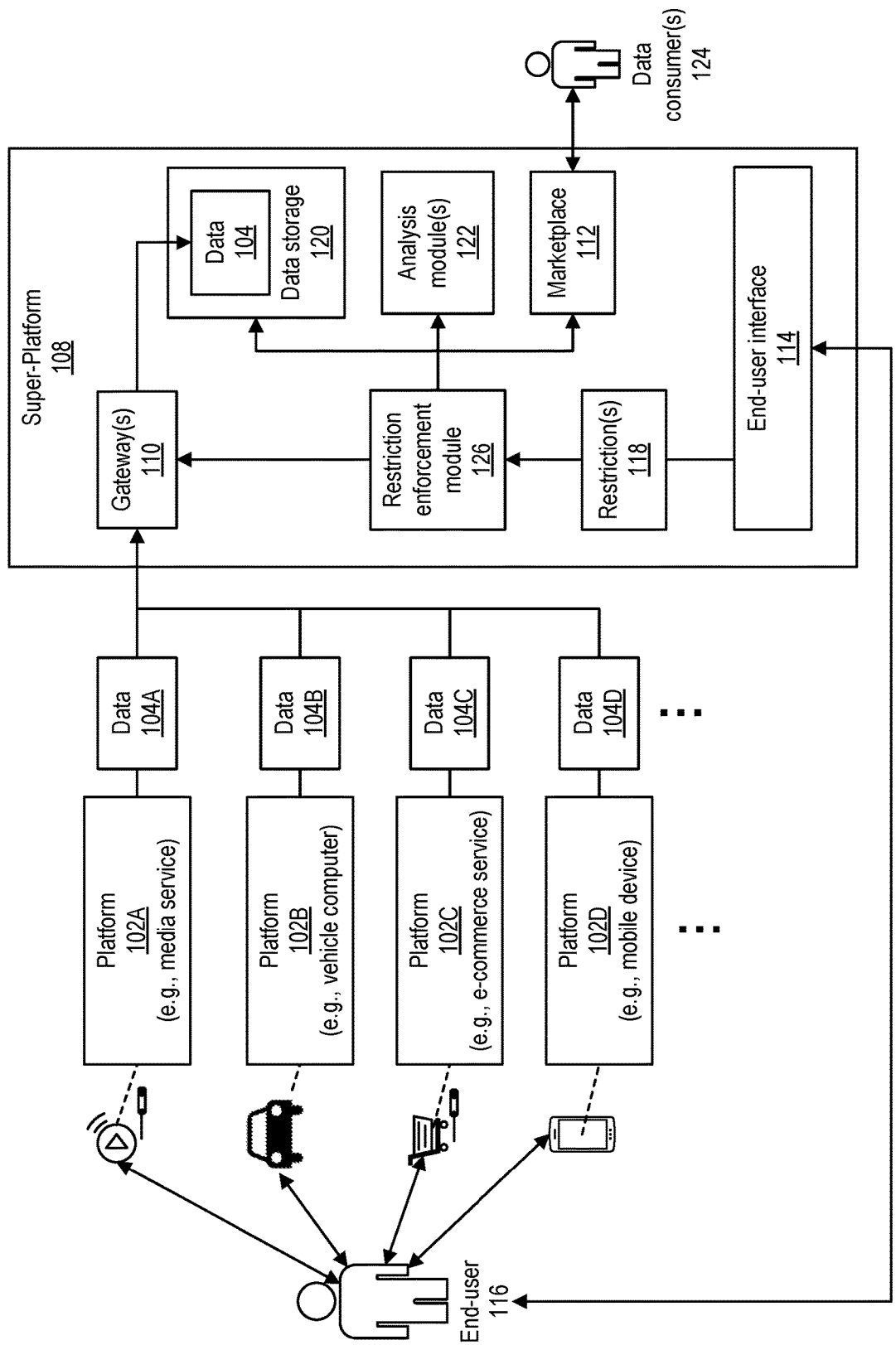
FIG. 1 depicts an example system for collecting data from multiple data generating platforms and processing the data in multiple stages of a data lifecycle, in accordance with implementations of the present disclosure.

Implementations of the present disclosure include systems, devices, methods, and computer-readable media for receiving data generated by multiple platforms of different types, and managing the data in multiple stages of a data lifecycle associated with a super-platform. An end-user may interact with multiple individual (e.g., siloed) platforms of different types or that support different business purposes or industries. The individual platforms may generate data describing, and/or resulting from, these interactions with end-user(s). The data from the various individual platforms may be received, ingested, stored, analyzed, aggregated, and/or otherwise processed by a super-platform during various stages of a data lifecycle. A data consumer may interact with a marketplace that is a component of, or in communication with, the super-platform. In some examples, the data consumer may request one or more data set(s), and the marketplace may assemble and provide the data set(s) in response to the request. The super-platform may support a data lifecycle including multiple stages for handling the data. In some implementations, the end-user, the super-platform, and/or the individual platform(s) may provide one or more restrictions on how the data may be handled in each of the stages of the data lifecycle.

As used herein, super-platform refers to a computing system that includes any number of computing devices executing any number of software modules to receive, analyze, aggregate, store, distribute, and/or otherwise process data generated by any number of individual platforms. In some instances, the super-platform may be separate from the individual platform(s) and configured to communicate with the platform(s) using one or more networks. In some instances, the super-platform may share computing hardware and/or software resources with at least one of the individual platforms that is generating data. The super-platform may be configured to process data generated by multiple individual platforms that provide different types of services, as described further below.

In some implementations, various types of entities (e.g., individuals, computing devices, processes, etc.) may interact with the super-platform. Such entities may include data disclosers, data manipulators, and data consumers. A data discloser may be any entity that generates and/or provides the data to the super-platform. A data discloser may also be any entity that causes the data to be generated and/or provided to the super-platform. For example, an end-user of individual platform(s) may be a data discloser. An individual platform may also, itself, be a data discloser. A data manipulator may be any entity that analyzes, aggregates, and/or otherwise processes the data. For example, the super-platform and/or the various processes executing on the super-platform may be described as data manipulators. In some instances, the individual platforms and/or end-users may be data manipulators as well as possibly data disclosers, e.g., in scenarios where the data discloser manipulates the data in some way prior to disclosing the data to the super-platform. A data consumer may be any entity that receives the data and/or any information that is generated through manipulation of the data (e.g., aggregate data, analysis results, etc.). A data consumer may purchase or otherwise acquire information from the super-platform. In some instances, a data consumer may also be a data manipulator and/or data discloser. For example, a data consumer may purchase a set of data from the super-platform, analyze (e.g., manipulate) the data to produce analysis result(s) and/or other data set(s), and sell (e.g., disclose) the analysis result(s) and/or other data set(s) to the super-platform, individual platform(s), and/or other entities. Accordingly, a particular entity may operate in accordance with one or more of the roles of data discloser, data manipulator, and/or data consumer depending on the particular circumstances.

FIG. 1 depicts an example system for collecting data from multiple data generating platforms, in accordance with implementations of the present disclosure. An end-user 116 may interact with multiple, different individual platforms 102. Each of the individual (e.g., siloed) platforms 102 may generate data 104 describing the end-user's interactions with the platform 102. In some implementations, the individual platforms 102 may provide different types of services, and/or may be different types of platforms that support businesses or other organizations in different types of industries. The platforms 102 may include, but are not limited to, one or more of the following:

A computing device, which may be a mobile or portable computing device such as a smartphone, tablet computer, notebook computer, personal data assistant (PDA), wearable computer (e.g., watch device or glasses device), and so forth;

An in-vehicle (e.g., automotive) computer that is a component of a commercial or personal-use vehicle or otherwise in communication with a vehicle, the in-vehicle computer configured to collect telematics data, data regarding the operations (e.g., speed, braking, gas mileage, etc.) of the vehicle, characteristics of the vehicle (e.g., temperature, fuel status, fluid status, etc.), location information, environment information (e.g., temperature, air pressure, etc.), and so forth;

Online services for streaming or otherwise delivering content over a network (e.g., the internet), such as video content, audio content (e.g., music), audio-visual content (e.g., films, television, etc.), games, graphics, images, or other media;

Online shopping or other e-commerce services that offer products or services through a web site, a native application, or other type of interface;

Computing systems, such as point-of-sale terminals, servers, data storage devices, and so forth that are associated with physical (e.g., brick-and-mortar) stores or other commercial enterprises, the computing systems collecting or otherwise generating data based on in-store customer activities;

Internet-of-things (IoT) computing devices, such as smart appliances, home entertainment devices, or other devices present in a home, business setting, or elsewhere, and configured to include processing, memory, and communications capabilities in a device used for other purposes, such as smart washing machines, heating and air conditioning systems, audio or video presentation systems, and so forth; or An analytics cloud or other distributed computing system, such as a social media analytics cloud (SMAC).

A platform 102 may include a technical (e.g., hardware and/or software) architecture, governance rules, and one or more technology services that support the creation and execution of applications. Such applications may be specific to a particular industry associated with the platform 102. For example, platforms 102 that are vehicle computing systems, brick-and-mortar retail support systems, health care provider systems, or health insurance portals may provide and support applications associated with vehicle operations, retail operations, health care operations, or health insurance operations respectively. A platform 102 may provide a blueprint for how a business or other organization may build, connect, and deliver applications specific to problems in their associated industry. A platform 102 may serve as a pool of reusable functionality and capabilities to make building and evolving applications fast and easy, and may help companies or other organizations achieve better business outcomes. A platform 102 may also serve as a business model strategy that creates competitive differentiation. In a platform-based business, others outside a company may create value for the enterprise and, in some examples, enable new digital models for the company.

A platform 102 may include any number of applications (e.g., apps), and service layers or plug-in modules that support one or more features. Example features include financial transactions, authentication, logon, navigation, search, advertisement, marketplaces, or any other appropriate feature. An individual platform 102 may include hardware, software, or both hardware and software components. For example, a platform 102 that is an in-vehicle (e.g., telematics) or other type of computing system may include hardware components such as processor(s), memory, network interfaces, and so forth, as well as software components such as an operating system, firmware, or any number of applications or processes executing on the hardware component(s). As another example, a platform 102 that is an e-commerce or media streaming service may include any number of web servers, application servers, applications, or other software component(s) that execute on one or more computing devices to enable an end-user 116 to view content or interact with the platform 102 through a user interface (UI).

The individual platforms 102 may each generate data 104 that is associated with end-user(s) 116, such as data describing user identity, user characteristics, user activities, user purchases, content browsed by the user, and so forth. In some examples, the data 104 may be provided to the platform(s) 102 by the end-user 116, or may be otherwise generated based on the end-user's interactions with the platform 102. The data 104 may include personally identifiable information (PII) of the end-user 116, such as user name(s), address(es), telephone number(s), login information (e.g., credentials) to access the individual platform 102, or other information that may enable identification of the particular end-user 116 or that is particularly associated with the end-user 116. The data 104 may also include other types of information that are associated with the particular end-user 116, but not necessarily explicitly provided by the end-user 116, such as information describing inferred or measured user characteristics (e.g., demographic characteristics), user activities on the platform 102, user purchase history, browsing data, clickstream data, and so forth. In some examples, the collected data 104 may include data that is generated by an individual platform 102 but that is not specific to a particular end-user 116. For example, an individual platform 102 that is a vehicle or in-vehicle telematics device may provide data 104 that is collected by sensors of the vehicle, such as data describing temperature, air pressure, location, velocity, vehicle operational state, or other information. As another example, a platform 102 that is a computing device may generate and provide data 104 describing the location of the device, used and available memory capacity, used and available processing capacity, used or available storage capacity, installed or executing applications, hardware configuration, software configuration, and/or other information that is not specifically associated with an end-user.

The data 104 generated by the platform(s) 102 may include any number of data objects. As used herein, a data object may include any size or amount of data that is arranged according to any format, or unformatted. A data object may include data of any type, and may include data that is compressed or uncompressed, encrypted or unencrypted. In some examples, a data object may include a particular amount of data and may be arranged according to a format such that the data object has a particular size when communicated. Data object(s) may also include a stream of data that continues for any duration to communicate any amount of data until the end of the stream. Data object(s) may be communicated in a sequence corresponding to an order of the data included in the data object(s). The data object(s) may also be communicated out of sequence, and may include sequence indicators or order indicators that enable a receiving process to reorder the received data object(s) into the order in which they were generated.

The data 104 generated by the individual platforms 102 may be sent to a (e.g., centralized) super-platform 108. For each individual platform 102, the super-platform 108 may include a gateway 110 that operates as an interface to receive the data 104 from the individual platform 102. The super-platform 108 may store the data 104, and may perform operations on the data 104 to process, store, analyze, aggregate, or otherwise handle the data 104 during various stages of the data lifecycle. The super-platform 108 may include any number of software modules executing on any number of computing devices. Such software module(s) may include a marketplace 112, the gateway(s) 110, a restriction enforcement module 126, module(s) for managing data storage 120, analysis module(s) 122, and/or an end-user interface 114. In some examples, the super-platform 108 may be implemented as a cluster or other group of server computers configured to execute the software module(s) that provide and support a super-platform service to ingest data 104, analyze, store, aggregate, or otherwise process the data 104, and distribute (e.g., sell) the data 104 through the marketplace 112 to data consumer(s) 124.

In some implementations, the data 104 received from the platform(s) 102 may be stored in data storage 120. The data storage 120 may be incorporated into the super-platform 108, as shown in FIG. 1. In some instances, the data storage 120 may be external to the super-platform 108 and accessible by the analysis module(s) 122, marketplace 112, and/or other software process(es) executing on the super-platform 108. Implementations support the use of any storage format for the data storage 120, including relational and/or non-relational data storage formats. In some instances, the data 104 may be stored in a compressed and/or encrypted form. The data storage 120 may be secured against access by unauthorized users, processes, or other entities.

In some implementations, the super-platform 108 may execute one or more analysis module(s) 122 that perform various types of processing of the data 104. For example, the analysis module(s) 122 may include module(s) that aggregate the data 104 to generate aggregate data. Data aggregation may aggregate data 104 that is associated with a single end-user 116 of one or more platforms 102. Data aggregation may also aggregate data 104 from multiple end-users. For example, data aggregation may generate data sets for particular segments of end-users, such as individuals having particular demographic characteristics, location, demonstrated interest in products or services, purchase history, and so forth. Aggregate data may include, or be generated based on, data that describes or identifies users, such as PII for one or more users. Aggregate data may also include, or be generated based on, data that is not associated with users, such as sensor data. The super-platform 108 may aggregate data 104 received from different platforms 102 that support different types of operations or that are associated with different industries. For example, the super-platform 108 may aggregate data 104 from an end-user's smartphone, from a brick-and-mortar retail business where the end-user shops, from the end-user's in-vehicle telematics device, and/or from a streaming video service used by the end-user.

The analysis module(s) 122 may also perform other types of analysis regarding the data 104, including but not limited to combination, correlation, mathematical and/or statistical analysis, analysis to identify trends and/or patterns in the data 104, analysis that employs machine learning techniques, semantic and/or natural language based analysis of text data, image and/or audio data analysis, or other types of processing. In some instances, the analysis module(s) 122 may also analyze the data 104, e.g., execute analysis job(s), according to analysis request(s) received from data consumer(s) 124, as described further below.

In some implementations, data 104 may be tagged or otherwise associated with metadata that describes various aspects of the data 104. For example, a temperature value in the data 104 may be associated with metadata identifying that particular portion of data 104 as a temperature value, or the metadata may indicate the unit of measure of that portion of data 104. In some examples, metadata may describe the source of the data 104, such as the individual platform 102 that generated the data 104, the particular end-user whose interactions with the individual platform 102 caused the generation of the data 104, and so forth. The metadata describing the source platform 102 may enable the super-platform 108 to perform various (e.g., unique or targeted) functions with regard to the data 104. For example, metadata identifying the source platform 102 may enable the data 104 to be retracted from use, or recalled from distribution, if it is later determined that the data 104 from the platform 102 is inaccurate in some way. Metadata may also identify a particular hardware or software component of the platform 102 that generated the data 104. For example, after ingestion of data 104 the individual platform 102 that supplied the data 104 may determine that a particular sensor that generated the data 104 is faulty, and the platform 102 may apply a restriction 118 indicating that the super-platform 108 prevent further use of data 104 from that particular sensor. As another example, the super-platform 108 may perform operations to remove the faulty data 104 from aggregate data, statistically correct for the inclusion of faulty data 104, or other operations, such as to offset a calibration abnormality of the sensor.

For a particular portion of data 104, the super-platform 108 may determine as much metadata as possible to describe the data 104. In this way, the super-platform 108 may be described as a metadata-rich environment that enables the data 104 to be interrogated or otherwise analysis in various ways, even in ways not anticipated when the data 104 was generated or received at the super-platform 108. Metadata may indicate a source of the data 104, such as one or both of the end-user or individual platform 102 that generated the data 104. Metadata may also indicate an owner of the data 104 at various stages in the data lifecycle of generation. The data lifecycle may include: ingestion by the super-platform 108; processing (e.g., analysis, aggregation, etc.); storage; distribution to data consumer(s); and deletion or retirement of the data 104. In some implementations, the metadata 106 is formatted according to a Resource Description Framework (RDF) or any other metadata format.

In some implementations, an individual platform 102 may provide metadata with the data 104 that is ingested into the super-platform 108. In examples where an individual platform 102 does not provide metadata, or provides incomplete metadata, the super-platform 108 may generate metadata for the ingested data 104. This generation of metadata may be through a natural language (NL) or semantic analysis of the ingested data 104. In some examples, the super-platform 108 may generate metadata such as location tags or time tags for the ingested data 104, e.g., based on other information indicating a location of the platform 102 or a time when the metadata was generated or received. In some examples, the super-platform 108 may infer or otherwise determine metadata for a portion of data 104 based on a semantic or format-based analysis of the data 104 to match the data 104 with one or more known patterns or formats of data. For example, if the data matches a known pattern or format for (e.g., "looks like") a value for air pressure, the data 104 may be tagged as air pressure data. The super-platform 108 may also add metadata based on context information that is known about the individual platform 102 or the end-user.

In some examples, the super-platform 108 may also flag data 104 that the super-platform 108 is unable to reliably tag (e.g., determine metadata) automatically with an adequate degree of confidence in the tagging. The flagging of data 104 that cannot be tagged may lead to a manual review and manual determination of metadata for the data 104. In some examples, metadata tagging may be performed at a higher level or with less detail describing the data 104. For example, it may be sufficient to know that a particular portion of data 104 is describing a movie, without knowing which particular aspect (e.g., title, genre, plot synopsis, cast, etc.) is being described by the data 104.

In some implementations, data analysis by the analysis module(s) 122 includes the normalization of data 104 received from different individual platforms 102. Such normalization may impose a common format for the metadata, or for the data 104 itself, in situations where different individual platforms 102 provide data 104 or metadata in different formats, styles, data types, and so forth. Normalization may also include determination that different sets of data 104 from different individual platforms 102 are associated with the same end-user, in examples where the different individual platforms 102 employ a different user identifier for the end-user. In such examples, normalization may generate or alter metadata to use a same user identifier to identify the same end-user. Normalization may normalize data 104 received from different countries or other geographical regions, to normalize the data 104 or metadata to employ a same system of measurement, language, or other format.

In some implementations, analysis module(s) 122 may determine and/or employ a semantic data model that describes the ingested data 104 for a single platform 102 or for multiple platforms 102. The semantic data model may sit on top of the other types of metadata and provide a framework or set of relationships that describes multiple portions of data 104 having different metadata. For example, a semantic data model may describe a movie and may describe relationships between differently metadata-tagged portions of data, such as a relationship between movie title, description, cast, studio, format, length, genre, and so forth. The semantic data model may be described as a structure or map of the data 104, and may be determined based on the metadata. In some examples, the semantic data model may be hierarchical. For example, data 104 describing a refinery may include multiple gauges, valves, or other components, and those components may have sub-components, which may themselves have sub-components, and so forth.

The super-platform 108 may be configured to dynamically adapt to the addition of new individual platforms 102 by determining how the data 104 provided by a new individual platform 102 fits into an existing semantic data model that describes previously ingested data 104 from other platform(s) 102. Capabilities of the newly added individual platform 102 may be determined by analogizing or otherwise comparing to the new platform 102 to existing, similar individual platforms. For example, a new platform 102 may be associated with the semantic data model of a currently supported platform 102 that is similar to the new platform 102 with regard to type of platform, hardware or software configuration, type of service provided by the platform, format of the data, mechanism(s) for accessing and/or receiving the data from the platform, or other characteristics of the platforms. In some implementations, machine learning may be employed to determine the semantic data model and/or other capabilities of a newly available platform 102. Machine learning algorithm(s) may examine data sets that are sufficiently described by metadata 106 and, using the metadata 106, may apply a semantic data model to a new data set from a new platform 102 that might extend, augment, improve, or stand alongside an existing data set from current platform(s) 102. The determination of metadata and/or models for data 104 may be performed by the analysis module(s) 122.

The super-platform 108 may also execute one or more software modules to provide a marketplace 112 that enables potential data consumer(s) 124 to request various data set(s) of the collected data 104, set(s) of aggregate data, result(s) of data analysis job(s), and/or other information. The marketplace 112 may provide such information in exchange for a fee paid by the data consumer(s) 124. In some instances, the marketplace 112 may distribute information without charging a fee.

The end-user 116 may access an end-user interface 114 provided by the super-platform 108. In some instances, the end-user 116 may employ the end-user interface 114 to specify pricing information indicating a price for one or more portions of data 104 associated with the end-user 116. Through the end-user interface 114, the end-user 116 may specify one or more restrictions 118 on the handling of the data 104 associated with the end-user 116. The restriction(s) 118 may also be specified by one or more individual platform(s) 102 and/or the super-platform 108 itself. In some implementations, the end-user(s) 116, platform(s) 102, and/or super-platform 108 may specify restriction(s) 118 that govern the handling of the data 104 during one or more stages of a multi-stage data lifecycle. In some implementations, a restriction enforcement module 126 (e.g., an agent process) may execute on the super-platform 108 to enforce restriction(s) 118 during one or more stages of the data lifecycle, as described further with reference to FIG. 2.

To account for the variety of restrictions on data use, the data and/or its permissions for use may be stored in an immutable block chain and/or other immutable data storage. This allows the data to retain its complete provenance from initial creation through each the data takes along its journey. The stored provenance information may indicate the reasons for the data sharing and use among various systems. By storing data and/or restrictions based on disclosure (e.g., human or machine) preferences in this way, implementations provide auditing as a feature of this system. Using a block chain also allows data owners to dynamically change permissions on existing data in the system. While the use of data in this block chain can be openly audited, the data assets themselves may not be retrievable outside of the super-platform without a client-side daemon executing on the data consumer's computing device (e.g., analytics appliance). The daemon may specify the conditions under which the data is to be used, download the data assets from the super-platform, decrypt the data assets, and/or append the metadata for each data asset on the block chain with the specific use. To audit for use compliance of specific data assets, a query of the block chain may return this information. Data disclosers (e.g., those who publish data to the system) may be able to modify their own data assets, but others may not be able to make such modifications.

Figure 2:
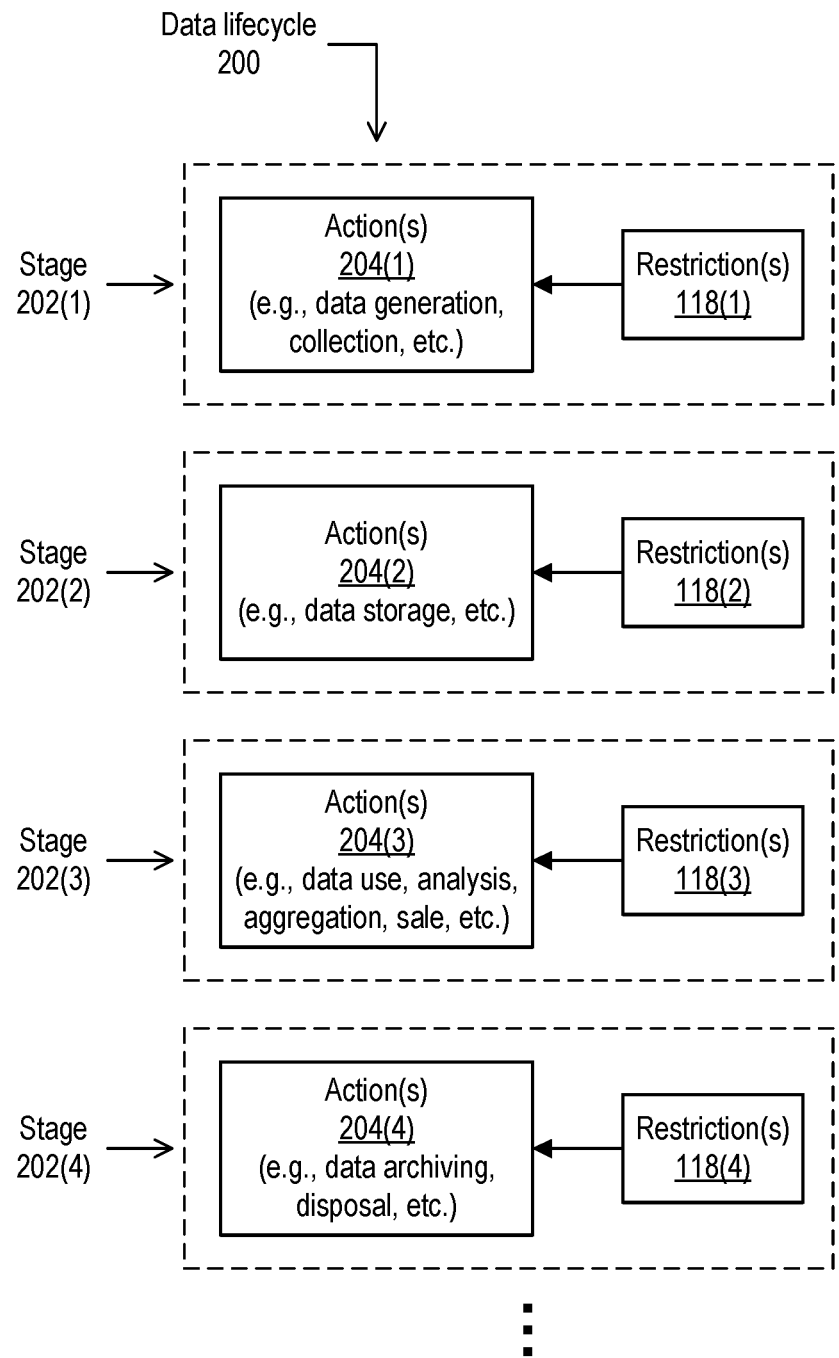
FIG. 2 depicts a schematic of an example data lifecycle including multiple stages, in accordance with implementations of the present disclosure.

FIG. 2 depicts a schematic of an example data lifecycle 200 including multiple stages 202, in accordance with implementations of the present disclosure. Although FIG. 2 depicts an example data lifecycle 200 that includes four stages 202, implementations support any number of stages 202 in the data lifecycle 200, with any number of action(s) 204 performed during each stage 202. As used herein, handling of the data 104 may include any action(s) performed with regard to the data 104. In some examples, the data 104 may pass through four different stages 202 of the data lifecycle 200, including:

Stage 202(1) in which action(s) 204(1) are performed, including the generation or creation of the data 104 by the platform(s) 102, and the collecting or receiving of the data 104 from the individual platforms 102 through the gateway(s) 110;

Stage 202(2) in which action(s) 204(2) are performed, including the storing of the data 104, and/or metadata, in the data storage 120;

Stage 202(3) in which action(s) 204(3) are performed, including various uses of the data 104 such as processing, aggregating, data modeling, determining metadata for the data 104, and/or other analysis of the data 104 by the analysis module(s), the storage of aggregate data and/or analysis results (e.g., in the data storage 120), the sale or other distribution of the data 104, aggregate data, analysis results, or other information to data consumer(s) 124 through the marketplace 112; and Stage 202(4) in which action(s) 204(4) are performed, including the archiving, deletion, and/or disposal of the data 104, aggregate data, analysis results, and/or other information, such that the information is no longer available for use, sale, or other types of handling.

The restriction(s) 118(1) on the action(s) 204(1) performed during the stage 202(1) may include restriction(s) on which particular data 104 may (or may not) be collected by the gateway(s) 110 of the super-platform 108. The restriction(s) 118(1) may also indicate types of data that may (or may not) be collected, such as PII.

The restriction(s) 118(2) on the action(s) 204(2) performed during the stage 202(2) may include restriction(s) on how and/or where the data 104 is stored. For example, restriction(s) 118(2) may indicate that the data 104 is to be stored in an encrypted or otherwise secure form to prevent unauthorized access. The restriction(s) 118(2) may also specify requirements for the security of the data storage 120 where the data 104 is stored.

The restriction(s) 118(3) on the action(s) 204(3) performed during the stage 202(3) may include restriction(s) on which data consumer(s) 124 are to be given access to the data 104, aggregate data 104 based on the data 104, analysis result(s) based on the data 104, or other information. Such restriction(s) may include a white list, or black list, of particular data consumer(s) to be given access or barred from access. The restriction(s) may also include a white list, or black list, of types, classes, or categories of data consumer(s). The restriction(s) may restrict particular uses, or types of uses, of the data 104. The restriction(s) may also govern other types of action(s) 204(3) performed during the stage 202(3).

The restriction(s) 118(4) on the action(s) 204(4) performed during the stage 202(4) may include restriction(s) on how, when, and/or whether the data 104 is retired, archived, deleted, destroyed, and/or otherwise made unavailable for further processing.

In some examples, the various stages 202 of the data lifecycle 200 may be performed in a time order. For example, stage 202(2) may occur after stage 202(1), stage 202(3) may occur after stage 202(2), and stage 202(4) may occur after stage 202(3), and so forth, such that the action(s) 204 in various stage(s) 202 are performed serially. In some examples, the timing of the stage(s) 202 may at least partly overlap such that stage(s) 202 occur in parallel and such that the action(s) 204 of different stages 202 are performed contemporaneously, at least in part. For example, the action(s) 204(2) in stage 202(2) (e.g., data storage) and/or stage 202(3) (e.g., data analysis) may be performed during a time period that at least partly overlaps with a time period during which the action(s) 204(1) in stage 202(1) (e.g., data collection) are performed. Implementations support a data lifecycle 200 that includes any number of stages 202 that are performed in any order, serially and/or in parallel.

As shown in FIG. 2, during each stage 202 a set of restriction(s) 118 may be applied that govern the action(s) 204 performed for handling the data 104 during that stage 202. Restriction(s) 118 may be specified by the end-user(s) 116, the individual platform(s) 102, and/or the super-platform 108. The restriction enforcement module 126 (e.g., agent process) may operate to ensure that restriction(s) 118 are complied with during each stage 202. During the stage 202(1), the restriction enforcement module 126 may interact with the gateway(s) 110 to enforce restriction(s) 118(1) on the collection and/or ingest of the data 104 from the platform(s) 102. During the stage 202(2), the restriction enforcement module 126 may interact with the data storage 120 to enforce restriction(s) 118(2) on the storage of the data 104 and/or metadata. During the stage 202(3), the restriction enforcement module 126 may interact with the analysis module(s) 122 to enforce restriction(s) 118(3) on the analysis of the data 104, and/or the marketplace 112 to enforce restriction(s) 118(3) on the sale or other distribution of the data 104, aggregate data based on the data 104, analysis result(s) based on analysis of the data 104, and/or other information. During the stage 202(4), the restriction enforcement module 126 may enforce restriction(s) 118(4) on the archiving, deletion, destruction, or other operations performed at or near the end of the data lifecycle 200 by the data storage 120 and/or other module(s).

In some examples, an end-user 116 may specify restriction(s) 118 on how their data 104 may be employed by data consumers 124, and/or restriction(s) 118 on which data consumers 124 may be allowed access to the data 104. A data consumer 124, when requesting data 104 through the marketplace 112, may include a description of how they intend to use the data 104. The end-user 116 may access the end-user interface 114 to approve or disapprove that particular use by the particular data consumer 124. Data 104 provided to data consumers 124 may identify the end-user 116 associated with the data 104, or may be anonymized or abstracted to not identify the end-user 116. In some examples, the various entities (e.g., end-users, individual platforms, and/or data consumers) may have full transparency into the change, use, and/or ownership of the data 104 during the various stages 202.

Depending on which stage of the data supply chain is being analyzed, implementations may examine different relevant aspects at each stage. Implementations may maintain provenance within the data store at each stage. The provenance metadata, maintained on a block chain, may also include information describing what entities have rights to use the data, what those entities have done to obtain those rights, and/or an accounting of what the entities have done with the data. Implementations may enable various questions to be answered at each stage of the data supply chain. Non-limiting examples of such questions are described below.

With respect to the acquire/store stage of the data lifecycle, implementations may provide a data discloser with answers to the following questions: Are data disclosers aware that data about them has been acquired? Are additional data subjects captured due to network associations in the data? Will data disclosers be able to access the data they have disclosed? Are disclosers aware of where or how their data is being stored? (e.g. outside of the country, through a cloud provider) Are data disclosers able to opt-out of their data being used?

With respect to the acquire/store stage of the data lifecycle, implementations may provide a data consumer with answers to the following questions: What methods were used to collect data sources? If data is coming from an external source, do data collection methods align with the organization's best practices? In regards to the different data types being used, are best practices for handling and using that type of data known throughout the organization/team? Are data techniques used during analysis appropriate with those used during production? Is data being stored without an intended use?

With respect to the aggregate/analyze stage of the data lifecycle, implementations may provide a data discloser with answers to the following questions: Can aggregated data misconstrue relevant information about a data subject? Would the aggregation of sources come as a surprise to data subjects? What is the most harm a bad actor or group of actors could cause if they had access to the aggregated data sources? Could the aggregated data be used to draw outside conclusions, irrelevant to the work at hand, about an individual's identity, personality, or way of living? Could the results of the proposed analysis have negative consequences for the data discloser outside of the application or service?

With respect to the aggregate/analyze stage of the data lifecycle, implementations may provide a data consumer with answers to the following questions: What would the reputational impact be on the organization if data were misused? Does the summation of aggregated data overstep the intended use of the data? Would research methodologies receive a favorable reaction if they were widely shared? Are there plans to revisit analyses and see how well they aligned with organizational code of ethics and governance models?

With respect to the use/application of insights stage of the data lifecycle, implementations may provide a data discloser with answers to the following questions: Did the data discloser provide consent to this specific data use? Do consent agreements make it clear that data could be used in the proposed way? Are there mechanisms in place to alert data disclosers their data is being used?

With respect to the use/application of insights stage of the data lifecycle, implementations may provide a data consumer with answers to the following questions: What is being done to ensure data use aligns to regulations around that type of data? Are there restrictions in place that prevent discussing where data sources are obtained or whom data sources are being shared with? Does the data used contain enough information for a third party or law enforcement to conduct surveillance on data disclosers? Do the conclusions from the analysis replace a data discloser's ability to make independent decisions?

With respect to the share/sell stage of the data lifecycle, implementations may provide a data discloser with answers to the following questions: Is it in the data discloser's best interest to have their data shared among third parties? Do data disclosers have any say in whether or not their data is shared or sold? Are data disclosers aware their data is being shared or sold? Do data disclosers expect control or ownership over the data they provide?

With respect to the share/sell stage of the data lifecycle, implementations may provide a data consumer with answers to the following questions: What parties are designated stewards of data once data is shared or sold? Does data sharing encroach on cultural norms about privacy or regulatory standards that need to be met? Does the act of sharing or selling data enhance the experience for the data discloser? Are there alternative models that could be used for sharing/selling data that provide greater control or transparency to data disclosers?

With respect to the delete/removal stage of the data lifecycle, implementations may provide a data discloser with answers to the following questions: Are data disclosers given the ability to delete their data? Are stakeholders aware of the time frame that their data will be retained and processed for disposal? Are data disclosers given the right to restrict future use of their data?

With respect to the delete removal stage of the data lifecycle, implementations may provide a data consumer with answers to the following questions: Are systems designed with the intentions of allowing users to delete their data? Is any metadata retained even after associated data are deleted?

The collected data 104, aggregate data, and/or analysis result(s) may be offered for sale or other distribution to data consumer(s) 124, such as data purchaser(s), through the marketplace 112. In some examples, an end-user 116 may opt in to allow their user-related data 104 to be sold or otherwise distributed through the marketplace 112. The end-user 116 may provide a price for their data 104. The end-user 116 may also provide restriction(s) 118 governing which data consumer(s) 124 may receive the end-user's data 104. The end-user 116 may also provide restriction(s) 118 governing the uses of the end-user's data 104 by potential data consumer(s) 124. For example, an end-user 116 may specify that their data may not be provided to data consumer(s) 124 that intend to use the data 104 for a particular purpose, such as research associated with a particular political position, campaign, or cause. As another example, an end-user 116 may specify that their data 104 may not be provided to particular types of organizations. For example, an end-user 116 may state that their data 104 may be sold to non-profit research organizations but not to for-profit corporations. An end-user 116 may also specify the manner in which their data 104 may be used. For example, an end-user 116 may specify that their data 104 may be used after it has been anonymized to remove and/or obfuscate any PII.

In some examples, the end-user 116 may specify restrictions 118 when they opt in or otherwise give permission for their data 104 to be sold or otherwise distributed, e.g., prior to the distribution or other use of the data 104. In some examples, the end-user 116 may access information presented through the end-user interface 114, the information indicating that their data 104 has been sold or otherwise provided for a particular purpose. Based on this information, the end-user 116 may indicate that their data 104 may not be subsequently sold for a similar purpose. Similarity may be determined based on a semantic (e.g., natural language) analysis of the stated purpose of a data consumer 124. In some implementations, the end-user 116 (e.g., data discloser) may have access to information (e.g., in a blockchain) describing a history of the various uses to which their data 104 has been put, who it has been sold to, how it has been analyzed, how it has been processed, and so forth. Based on such information, the end-user 116 may learn that their data 104 has been sold to or shared with a data consumer 124 and the end-user 116 may request some remuneration such as a percentage of the sale price. While data disclosers can inspect where their data has gone and what it has been used for, implementations may provide that remuneration requests from data disclosers are up-front as part of the initial data ingest.

In some instances, the ingest process may be better suited toward data disclosers who are associated with large portfolios of data generation populations, e.g., of people and/or machines. When a data discloser adds a dataset to the platform, they may have a wide array of preferences they can select from through a form-based, interactive user experience provided by the super-platform. In addition to agreeing to disclosures on the various ways their data might be used, data disclosers may also be asked about their preferences for remuneration (and disclosers can make these conditional based on use cases). For example, a data discloser might choose to make their data free for purposes of academic research, but charge for use by private corporations. Data disclosers might allow their data to be combined with other data sets for humanitarian use cases, but require that it be used in isolation if used by defense contractors. Data disclosures can choose who may use their data, how they use that data, for what purpose, and for what cost. These conditions can be updated by the platform at any time and can also be crowd-sourced from actors (e.g., data disclosers, data manipulators, and/or data consumers) within the ecosystem.

In some examples, the end-user 116 may specify restriction(s) 118 to restrict the sale and/or use of their data 104 based on a static set of categories. The set of categories may also be dynamic in that the end-user 116 may be able to add new categories for possible restriction of data sale or use. Categories may be arranged hierarchically. For example, an end-user 116 may be able to restrict data usage within a broad category (e.g., political research) or within a more specific category (e.g., political research related to a particular campaign, party, or candidate). The super-platform 108 may generate push notifications or other types of messages that are sent to an end-user 116 to indicate that the end-user's data 104 has been purchased or used for a particular purpose by one or more data consumers 124. In some implementations, the end-user 116 may access the end-user interface 114 in response to receiving the push notifications or other messages, and the end-user 116 may provide further restriction(s) 118 to prevent similar use and/or distribution in the future, or to terminate the current use and/or distribution described in the message(s).

The restriction(s) 118 may also include, but are not limited to: time constraints, indicating a particular time period during which the data 104 may be accessed and used; constraints indicating whether the data 104 may be used in an aggregate form with other data, or whether the data 104 may be used in its individual, originally collected, form; constraints indicating whether the data 104 is to be anonymized to remove and/or obfuscate PII prior to sale, distribution, and/or use; and so forth.

Although examples herein may describe the restriction(s) 118 as a black list, e.g., a set of restricted uses and/or data consumer(s) 124, implementations are not so limited. In some implementations, the restriction(s) 118 may be a white list, in which the end-user 116 specifies a list of allowed uses and/or allowed data consumer(s) 124. In such examples, a requested distribution of data may be blocked or a requesting data consumer 124 may be denied access to the data 104 unless the data consumer's stated use and/or the data consumer 124 is included in the white list of allowed uses and/or data consumer(s) 124.

As described above, the analysis module(s) 122 may perform aggregation or other types of analyses. Aggregation may generate aggregate data sets based on data from multiple individual platforms 102 or multiple end-users 116. Data 104 may be aggregated according to particular demographic characteristics, location, and/or other characteristics. For example, the marketplace 112 may collect user data from users in Iowa and aggregate the data to create a data set describing the buying habits, browsing habits, or other characteristics of users in a particular market segment defined by location, age, gender, or other criteria. In some examples, restriction(s) 118 may indicate that the aggregate data sets are to be generated such that they do not include any PII. In some examples, the aggregate data sets may be generated based on particular requests from data consumers 124. The analysis module(s) 122 may also generate aggregate data sets prior to, and in anticipation of, receiving any particular aggregate data set request(s) and/or analysis request(s).

The super-platform 108 may create an adhesive experience for data consumers 124, such that data consumer(s) 124 are incentivized to return to the super-platform 108 for their future data needs. This adhesive experience may be achieved by providing data consumers 124 with data 104, aggregate data, analysis job(s), and/or data analysis result(s) that the data consumer(s) 124 may not have access to elsewhere. By providing, analyzing, and/or aggregating data 104 generated by multiple individual platforms 102, the super-platform 108 may provide greater value than that provided by the individual platform(s) 102 alone.

Various actions may be performed in instances where the ingested data 104 is later determined to be inaccurate or fraudulent, after the data 104 has been distributed to data consumer(s) 124 and/or after aggregate data or analysis result(s) based on the data 104 have been distributed. In some examples, the data 104 may be associated with metadata that indicates a source, version, or timestamp for the data 104. The super-platform 108 may provide an interface that enables the data consumer(s) 124 to check existing purchases and/or other data distributions for changes or alerts regarding the integrity of the data 104 generated by various platforms 102. The super-platform 108 may notify the data consumer(s) 124 that previous distributed information may be inaccurate in some way, and may provide the data consumer(s) 124 with the option to received updated data that at least partly corrects the flaws of the previously distributed data. Such updates may be implemented using a content management system with version control. In some examples, the individual platform(s) 102 may inform the super-platform 108 that previously provided data 104 is inaccurate. In some examples, the super-platform 108 may be configured to determine that data 104 previously received at the super-platform 108 is inaccurate.

Figure 3:
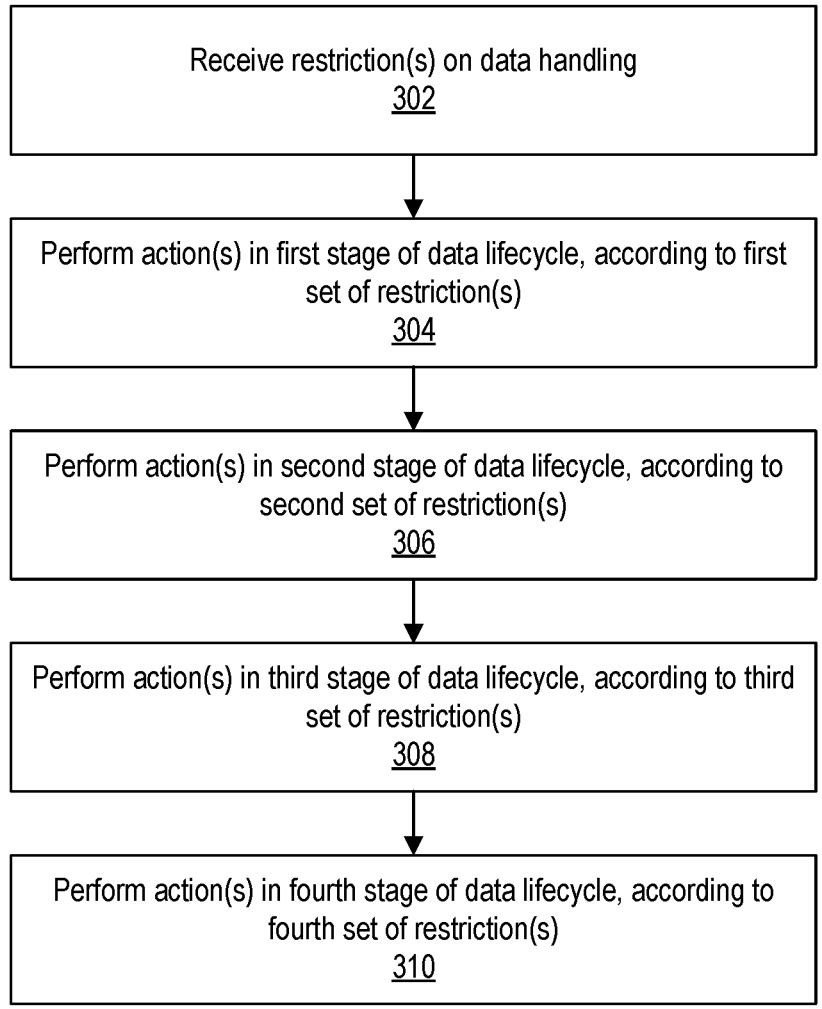
FIG. 3 depicts an example process for managing data handling in multiple stages of a data lifecycle, in accordance with implementations of the present disclosure.

FIG. 3 depicts an example process for managing data handling in multiple stages 202 of a data lifecycle 200, in accordance with implementations of the present disclosure. Operations of the process may be performed by one or more of the gateway(s) 110, the restriction enforcement module 126, the data storage 120, the analysis module(s) 122, the marketplace 112, the end-user interface 114, and/or other software module(s) executing on the super-platform 108, the platform(s) 102, or elsewhere.

Restriction(s) 118 may be received (302). As described above, the restriction(s) 118 may restrict the handling of data 104 at various stages 202 in the data lifecycle 200. The restriction(s) 118 may be provided by end-user(s) 116, platform(s) 102, and/or the super-platform 108.

Action(s) 204(1) may be performed (304) in a first stage 202(1) of the data lifecycle 200, according to a first set of restriction(s) 118(1). Such action(s) 204(1) may include the generation of the data 104 by the platform(s) 102 and/or the collection (e.g., ingest) of the data 104 by the super-platform 108.

Action(s) 204(2) may be performed (306) in a second stage 202(2) of the data lifecycle 200, according to a second set of restriction(s) 118(2). Such action(s) 204(2) may include the storage of the data 104.

Action(s) 204(3) may be performed (308) in a third stage 202(3) of the data lifecycle 200, according to a third set of restriction(s) 118(3). Such action(s) 204(3) may include the analysis, aggregation, and/or other processing of the data 104. Action(s) 204(4) may also include the distribution (e.g., sale) and/or other uses of the data 104, aggregate data, analysis result(s), and/or other information that is based on the data 104.

Action(s) 204(4) may be performed (310) in a fourth stage 202(4) of the data lifecycle 200, according to a fourth set of restriction(s) 118(4). Such action(s) 204(4) may include the generation of the data 104 by the platform(s) 102 and/or the collection (e.g., ingest) of the data 104 by the super-platform 108.

In some implementations, the super-platform may distinguish between data that is specific to a particular user (e.g., user ID, user purchases, content viewed by user, etc.), and data that is non-specific (e.g., sensor data, ambient temperature measured at platform, etc.). Such distinctions may be made by the super-platform to maintain data integrity and/or accuracy. For example, in situations where data describes a person and that person is domiciled in a state with particular controls on data, that information may be maintained for individual records (e.g., for people and devices). Provenance of data may be important in such instances and the super-platforms may be configured to maintain information about where the data originated. For example, if the data is from a sensor, the super-platform may store information regarding the make, model, firmware revision, and/or OS version of the sensor. If new information is later received indicating that the sensor is buggy, the super-platform may provide that information to enable various entities decide accordingly whether, and/or to what extent, to trust the possibly inaccurate data from the sensor. Origination and/or other provenance information may also be employed for at least the reasons described above.

In some implementations, the super-platform may make a distinction based on whether data analysis is performed on the super-platform or on a computing device controlled by the data consumer. In some instances, sensitive data sets may only be available for analysis on the super-platform and may not be available for analysis by on-premises applications executing on a computing device controlled by other entities. Accordingly, in some implementations a daemon and/or local agent may execute on a data consumer's device to ensure that the consumer's stated purpose is consistent with the analysis performed.

In some implementations, the super-platform may attempt to avoid providing duplicate data to data consumers, e.g., in instances where the original user-specific data may be aggregated to generate aggregate data that is abstracted away from the user. For example, duplicate data may be cleansed (e.g., removed, deprecated, marked as duplicate, etc.). In some implementations, duplicate data may be maintained to ensure that particular data is sufficiently described within the system. This may aid in the detection of duplicate data. In some instances, the presence of duplicates within an aggregate data set can be a net advantage. For example, duplicate data may not affect the aggregation phase, but may higher confidence levels at an analysis phase.

Figure 4:
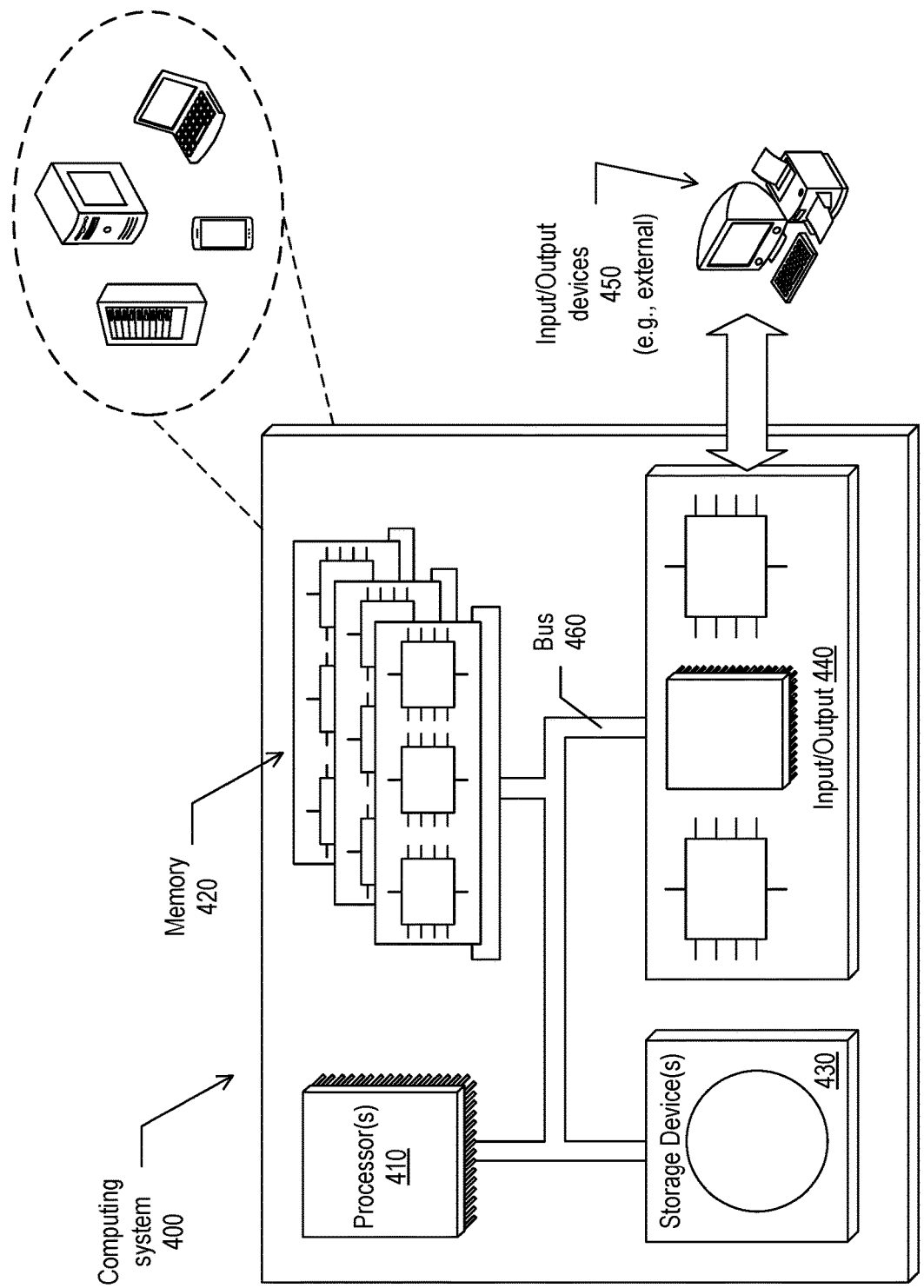
FIG. 4 depicts an example computing system architecture, in accordance with implementations of the present disclosure.

FIG. 4 depicts an example computing system 400 in accordance with implementations of the present disclosure. The system 400 may be used for any of the operations described with respect to the various implementations discussed herein. For example, the system 400 may be included, at least in part, in one or more of platforms 102, the super-platform 108, and/or other device(s) described herein. The system 400 may include one or more processors 410, a memory 420, one or more storage devices 430, and one or more input/output (I/O) devices 450 controllable through one or more I/O interfaces 440. Two or more of the components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
    receiving, by a super-platform, restrictions governing handling of data during multiple stages of data lifecycles of respective data, the restrictions being received from a user and the data being generated by each of a plurality of individual platforms on behalf of the user and being transmitted to the super-platform;
    receiving, by the super-platform, first data from a first individual platform of the plurality of individual platforms and second data from a second individual platform of the plurality of individual platforms, the first data comprising first metadata indicating that the first individual platform sourced the first data, and the second data comprising second metadata indicating that the second individual platform sourced the second data;
    determining, by the super-platform, that a first restriction received from the user is applicable to the first data, and that a second restriction received from the user is applicable to the second data;
    providing, by the super-platform, aggregate data at least partially based on the first data of the user and data of one or more other users;
    applying, by the super-platform, the first restriction to data handling actions performed on the aggregate data, and the second restriction to data handling actions performed on the second data during a data lifecycle of the second data; and
    determining, by the super-platform, that the at least a portion of the first data comprises faulty data, and in response: identifying that the first data was sourced from the first individual platform based on the metadata, and applying a restriction to prevent further use of data sourced from the first individual platform.

2. The method of claim 1, wherein the multiple stages include a first stage in which the data handling actions include one or more of:
    generation of the data at the plurality of individual platforms; or
    collection of the data at the super-platform.

3. The method of claim 1, wherein the multiple stages include a second stage in which the data handling actions include storage of the data.

4. The method of claim 1, wherein the multiple stages include a third stage in which data handling actions include one or more of:
  sale of the data to at least one data consumer;
  distribution of the data to the at least one data consumer;
  aggregation of the data; or
  analysis of the data.

5. The method of claim 1, wherein the multiple stages include a fourth stage in which data handling actions include one or more of:
  archiving the data; or
  deletion of the data.

6. The method of claim 1, further comprising receiving at least one restriction from one or more of at least one of the plurality of individual platforms, and the super-platform.

7. The method of claim 1, wherein the plurality of individual platforms include at least two of:
  an e-commerce platform configured to provide an e-commerce service;
  a retail platform configured to support retail operations of a physical store;
  a media platform configured to provide an online media service;
  a mobile computing device;
  an Internet of Things (IoT) computing device; or
  an in-vehicle computer.

8. A system comprising:
  at least one processor; and
  a memory communicatively coupled to the at least one processor, the memory storing instructions which, when executed by the at least one processor, cause the at least one processor to perform operations comprising:
    receiving, by a super-platform, restrictions governing handling of data during multiple stages of data lifecycles of respective data, the restrictions being received from a user and the data being generated by each of a plurality of individual platforms on behalf of the user and being transmitted to the super-platform;
    receiving, by the super-platform, first data from a first individual platform of the plurality of individual platforms and second data from a second individual platform of the plurality of individual platforms, the first data comprising first metadata indicating that the first individual platform sourced the first data, and the second data comprising second metadata indicating that the second individual platform sourced the second data;
    determining, by the super-platform, that a first restriction received from the user is applicable to the first data, and that a second restriction received from the user is applicable to the second data;
    providing, by the super-platform, aggregate data at least partially based on the first data of the user and data of one or more other users;
    applying, by the super-platform, the first restriction to data handling actions performed on the aggregate data, and the second restriction to data handling actions performed on the second data during a data lifecycle of the second data; and
    determining, by the super-platform, that the at least a portion of the first data comprises faulty data, and in response: identifying that the first data was sourced from the first individual platform based on the metadata, and applying a restriction to prevent further use of data sourced from the first individual platform.

9. The system of claim 8, wherein the multiple stages include a first stage in which the data handling actions include one or more of:
  generation of the data at the plurality of individual platforms; or
  collection of the data at the super-platform.

10. The system of claim 8, wherein the multiple stages include a second stage in which the data handling actions include storage of the data.

11. The system of claim 8, wherein the multiple stages include a third stage in which data handling actions include one or more of:
  sale of the data to at least one data consumer;
  distribution of the data to the at least one data consumer;
  aggregation of the data; or
  analysis of the data.

12. The system of claim 8, wherein the multiple stages include a fourth stage in which data handling actions include one or more of:
  archiving the data; or
  deletion of the data.

13. The system of claim 8, further comprising receiving at least one restriction from one or more of at least one of the plurality of individual platforms, and the super-platform.

14. The system of claim 8, wherein the plurality of individual platforms include at least two of:
  an e-commerce platform configured to provide an e-commerce service;
  a retail platform configured to support retail operations of a physical store;
  a media platform configured to provide an online media service;
  a mobile computing device;
  an Internet of Things (IoT) computing device; or
  an in-vehicle computer.

15. One or more computer-readable storage media storing instructions which, when executed by at least one processor, cause the at least one processor to perform operations comprising:
  receiving, by a super-platform, restrictions governing handling of data during multiple stages of data lifecycles of respective data, the restrictions being received from a user and the data being generated by each of a plurality of individual platforms on behalf of the user and being transmitted to the super-platform;
  receiving, by the super-platform, first data from a first individual platform of the plurality of individual platforms and second data from a second individual platform of the plurality of individual platforms, the first data comprising first metadata indicating that the first individual platform sourced the first data, and the second data comprising second metadata indicating that the second individual platform sourced the second data;
  determining, by the super-platform, that a first restriction received from the user is applicable to the first data, and that a second restriction received from the user is applicable to the second data;
  providing, by the super-platform, aggregate data at least partially based on the first data of the user and data of one or more other users;
applying, by the super-platform, the first restriction to data handling actions performed on the aggregate data, and the second restriction to data handling actions performed on the second data during a data lifecycle of the second data; and
  determining, by the super-platform, that the at least a portion of the first data comprises faulty data, and in response: identifying that the first data was sourced from the first individual platform based on the metadata, and applying a restriction to prevent further use of data sourced from the first individual platform.

16. The one or more computer-readable storage media of claim 15, wherein the multiple stages include a first stage in which the data handling actions include one or more of:
   generation of the data at the plurality of individual platforms; or
   collection of the data at the super-platform.

17. The one or more computer-readable storage media of claim 15, wherein the multiple stages include a second stage in which the data handling actions include storage of the data.

18. The one or more computer-readable storage media of claim 15, wherein the multiple stages include a third stage in which data handling actions include one or more of:
   sale of the data to at least one data consumer;
   distribution of the data to the at least one data consumer;
   aggregation of the data; or
   analysis of the data.

19. The one or more computer-readable storage media of claim 15, wherein the multiple stages include a fourth stage in which data handling actions include one or more of:
   archiving the data; or
   deletion of the data.

20. The one or more computer-readable storage media of claim 15,
   further comprising receiving at least one restriction from one or more of at least one of the plurality of individual platforms, and the super-platform.

* * * * *